United States Patent
Massoudi

(10) Patent No.: US 7,533,387 B1
(45) Date of Patent: May 12, 2009

(54) GUARANTEED INVOCATION/CONSUMPTION OF NESTED, COMPOSITE SOFTWARE SERVICES

(75) Inventor: Arash Massoudi, Dublin, CA (US)

(73) Assignee: Nextaxiom Technology, Inc., San Francisco, CA (US)

( * ) Notice: Subject to any disclaimer, the term of this patent is extended or adjusted under 35 U.S.C. 154(b) by 884 days.

(21) Appl. No.: 10/711,318

(22) Filed: Sep. 10, 2004

Related U.S. Application Data

(60) Provisional application No. 60/481,349, filed on Sep. 10, 2003.

(51) Int. Cl.
*G06F 3/00* (2006.01)
(52) U.S. Cl. ...................................... 719/328
(58) Field of Classification Search .................. 719/328, 719/330
See application file for complete search history.

(56) References Cited

U.S. PATENT DOCUMENTS

| | | | |
|---|---|---|---|
| 5,768,588 A * | 6/1998 | Endicott et al. ............. | 719/316 |
| 6,253,366 B1 * | 6/2001 | Mutschler, III ............. | 717/104 |
| 6,457,064 B1 * | 9/2002 | Huff et al. ................... | 719/318 |
| 6,563,441 B1 | 5/2003 | Gold | |
| 6,684,222 B1 | 1/2004 | Cornelius et al. | |
| 6,697,363 B1 | 2/2004 | Carr | |
| 6,775,822 B1 | 8/2004 | Apte et al. | |
| 6,804,773 B1 * | 10/2004 | Grigsby et al. ................. | 713/1 |
| 6,832,219 B2 | 12/2004 | Lal | |
| 6,917,620 B1 | 7/2005 | Sindhu et al. | |
| 6,925,631 B2 | 8/2005 | Golden | |
| 6,985,939 B2 | 1/2006 | Fletcher et al. | |
| 6,996,589 B1 | 2/2006 | Jayaram et al. | |
| 7,159,185 B1 | 1/2007 | Vedula et al. | |
| 7,171,672 B2 * | 1/2007 | Just .............................. | 719/330 |
| 7,194,485 B2 | 3/2007 | Kaipa et al. | |
| 2004/0015564 A1 | 1/2004 | Williams | |
| 2004/0183838 A1 | 9/2004 | Lahiri et al. | |
| 2004/0239674 A1 | 12/2004 | Ewald et al. | |
| 2005/0015491 A1 | 1/2005 | Koeppel | |
| 2005/0044197 A1 | 2/2005 | Lai | |
| 2005/0050526 A1 | 3/2005 | Dahne-Steuber et al. | |
| 2005/0182779 A1 | 8/2005 | Perry et al. | |

\* cited by examiner

*Primary Examiner*—Meng-Ai An
*Assistant Examiner*—Lechi Truong
(74) *Attorney, Agent, or Firm*—Workman Nydegger

(57) ABSTRACT

Methods, systems, frameworks and software products are disclosed for semantic-based definition, and guaranteed invocation/consumption of nested composite software services containing other composite or atomic software services, such as but not limited to Web services.

20 Claims, 5 Drawing Sheets

GUARANTEED INVOCATION/CONSUMPTION OF NESTED, COMPOSITE SOFTWARE SERVICES

CROSS-REFERENCES TO RELATED APPLICATIONS

This application claims the benefit of U.S. Provisional Application Ser. No. 60/481,349, filed on Sep. 10, 2003, entitled "Guaranteed invocation of nested, composite software services", which is incorporated herein by reference.

BACKGROUND OF THE INVENTION

1. Field of the Invention

The present invention relates to the field of software application development and, in particular, to service-oriented programming and guaranteed invocation/consumption of nested, composite software services.

2. Description of the Related Art

The current art of asynchronous message-oriented communication provides for guaranteed messaging. Based on the current art, a messaging system such as IBM's MQSERIES will guarantee the once and only once processing of a message. With the advent of Web Services and standards-based, service-oriented communication, the same concept has been extended to the delivery and processing of the input data of a service upon consumption.

Service-oriented programming introduces the concept of nested composite software services, where a software service may contain other software services that may themselves be composite software services. The current art of guaranteed messaging and reliable service-oriented communication is based on guaranteed delivery of messages or inputs of a service and does not address guaranteed consumption/invocation of nested composite services. In fact, addressing the guaranteed consumption/invocation of nested composite services is beyond the scope of the current approach to guaranteed messaging and reliable service-oriented communication.

Without innovative features such as guaranteed invocation/consumption of nested composite services, service-oriented programming, applications and architecture cannot address the needs of mission-critical applications.

SUMMARY OF THE INVENTION

A principle object of the present invention is to provide a method for guaranteeing the exactly once consumption/invocation of a software service, including, but not limited to, "Web services", where the software service may be a composite software service: a service that is composed of other services nested without a fixed limit on the depth of composition [FIG. 3]. Furthermore, the present invention guarantees the exactly once consumption of the services contained within the composite service and possibly those services contained within the contained services, regardless of depth of containment, if the invocation of a containing service is declared to be guaranteed.

The present invention provides a persistent, nested context mechanism capable of remembering the state of execution corresponding to the invocation of nested composite services as it relates to guaranteed invocation.

Yet another object of the present invention is to provide semantic-based configurable behavior, through software service composition tools, for the automated guaranteed invocation of a software service within user specified limits.

Other objects and advantages of this invention will be set in part in the description and in the drawings that follow and, in part, will be obvious from the description, or may be learned by practice of the invention. Accordingly, the drawings and description are to be regarded as illustrative in nature, and not as restrictive.

To achieve the foregoing objectives, in accordance with the purpose of the invention as broadly described herein, and with reference to FIG. 5, the present invention provides methods, frameworks, and systems for providing a method for guaranteed invocation of optionally nested composite services. In preferred embodiments, this technique comprises: 1) associating the attribute required for the guaranteed invocation to the service interface definition (501); 2) providing the ability to overwrite those attributes for a service contained within another composite service, in the context of the containing service (502); 3) defining a wrapper interface with methods accommodating the guaranteed invocation of non-composite services (503); 4) creating a directed execution graph based on the definition of a composite service having one such graph per each embedded composite service (504); 5) creating a possibly nested Invocation Map corresponding to the state of execution of each instance of a composite service (505); 6) coupling a persistent context mechanism with each Invocation Map (506); 7) associating unique IDs to each service invocation while breaking the invocation into steps based on the directed execution graph (507); 8) recording each step (508); 9) performing each step of invocation and marking the results through the persistent context mechanism where a result of the invocation of a contained service is recorded (509); 10) upon a system failure, or inability to invoke a service due to a system failure such as connection failure, attempting to retry the invocation of the service from where it previously left the invocation, based on the state of the associated context mechanism (510); 11) upon the unknown state of the invocation of a particular service, invoking the service with the same ID with which it was invoked prior to the unknown state (511).

The present invention will now be described with reference to the following drawings, in which like reference numbers denote the same element throughout. It is intended that any other advantages and objects of the present invention that become apparent or obvious from the detailed description or illustrations contained herein are within the scope of the present invention.

DESCRIPTION OF THE PREFERRED EMBODIMENTS

The reliable and correct execution of composite software services, including, but not limited to Web services, is a key concern in the implementation of the emerging service-oriented systems that support building service-oriented software solutions. Addressing the reliable invocation/consumption of nested, composite software services at runtime requires an automation platform to guarantee the invocation of a composite software service. Furthermore, this guarantee must include at least once, as well as exactly once semantics for the invocation of each software service contained within a composite service regardless of the depth of containment. The current art of guaranteed messaging as it relates to message-oriented systems can only address the protocols required for the guaranteed invocation of an atomic software service, one that is not composed of other software services. The present invention goes beyond the current art and provides an automated, declarative method for guaranteeing the invocation of nested composite software services with once and exactly once semantics.

Figure 2:
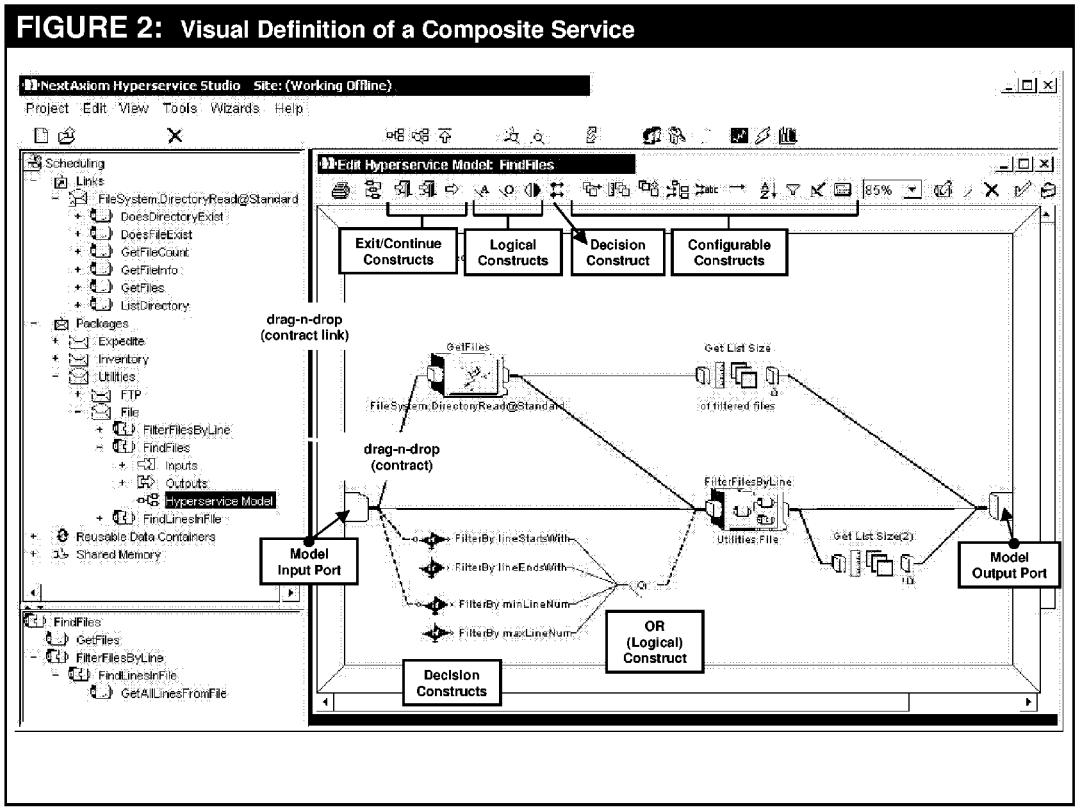
FIG. 2 shows visual composition of a software service using a service composition and assembly tool, HyperService™ Studio.
Figure 3:
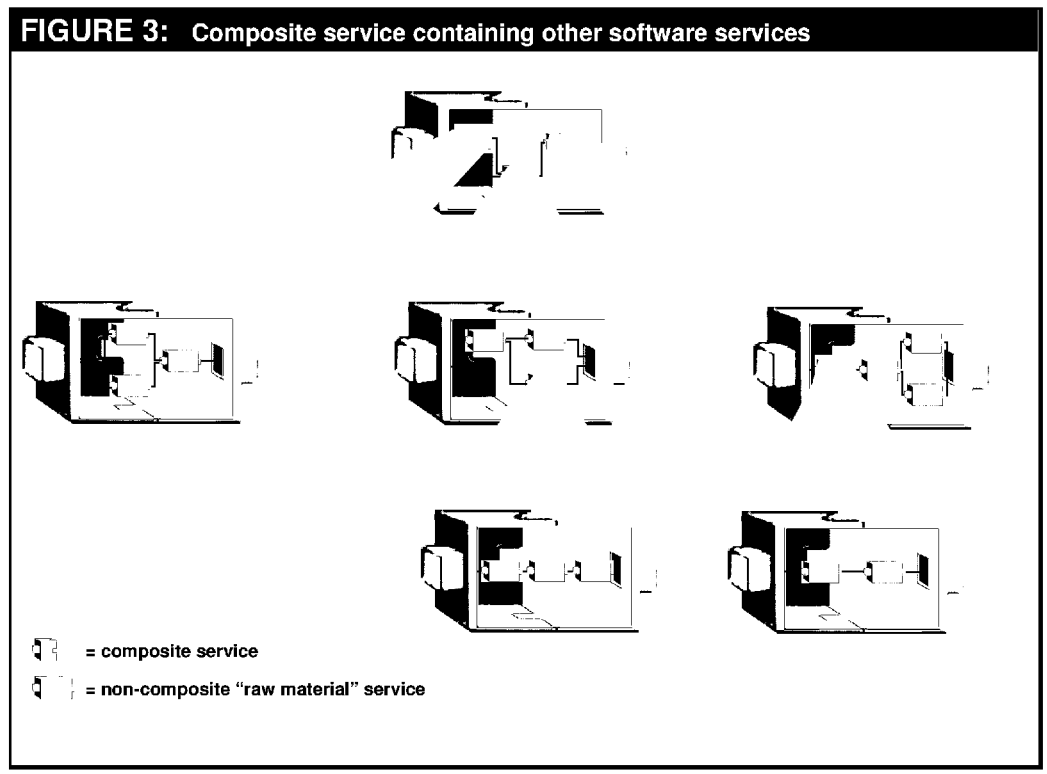
FIG. 3 shows the nesting of other software services within a composite software service.

Assuming a visual software service composition and assembly tool, such as HyperService™ Studio, with a snapshot of a definition in FIG. 2, and an automatic flow platform, such as the HyperService™ platform provided by NextAxiom® Technology Inc., we will now describe how such a composition tool and platform can be extended to accommodate declarative, automated guaranteed invocation for optionally, nested composite software services.

Figure 1:
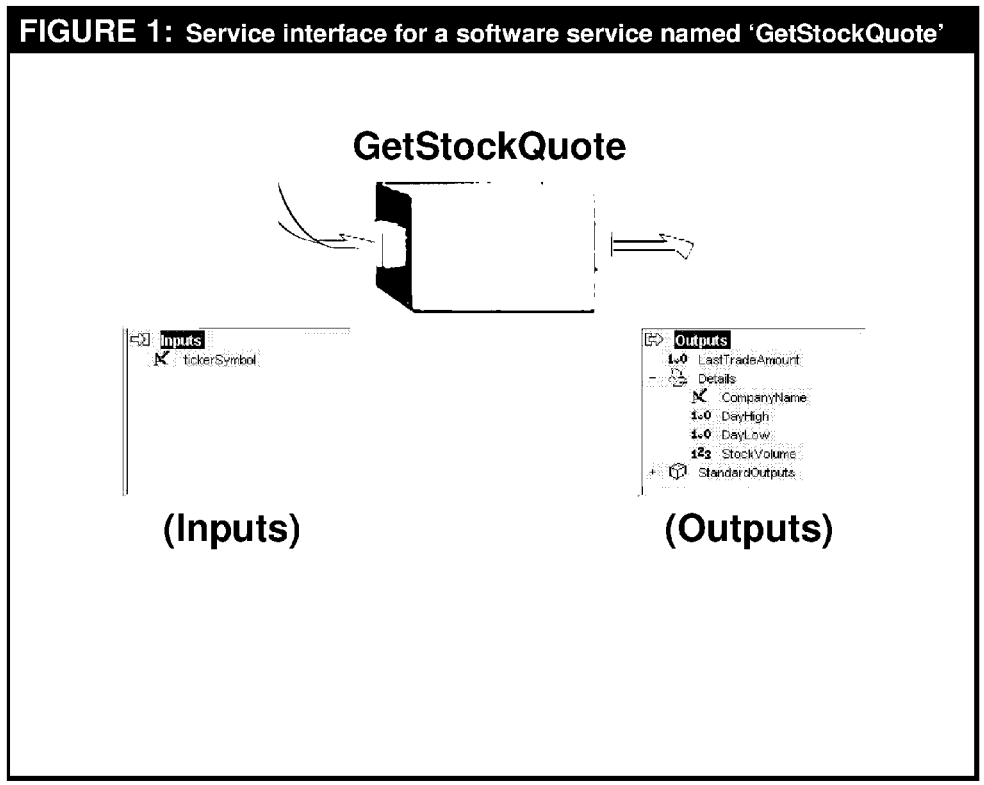
FIG. 1 depicts an example interface of a software service named 'GetStockQuote'.
Figure 4:
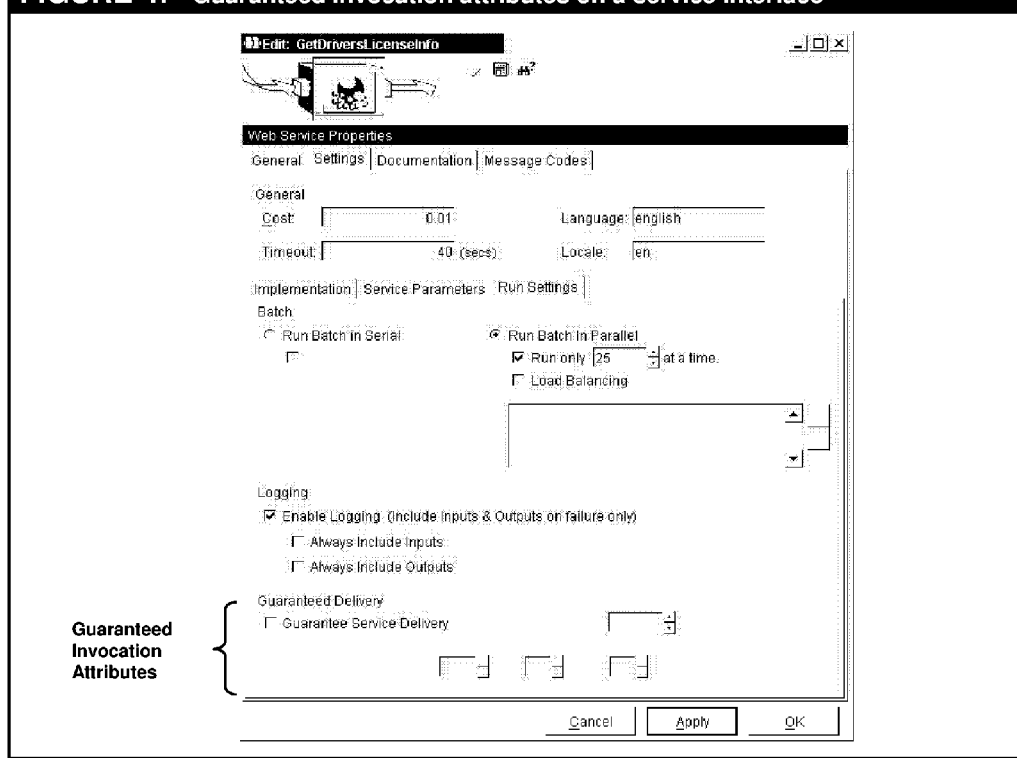
FIG. 4 shows an example of attributes that can be associated with a software interface to declare guaranteed invocation behavior
Figure 5:
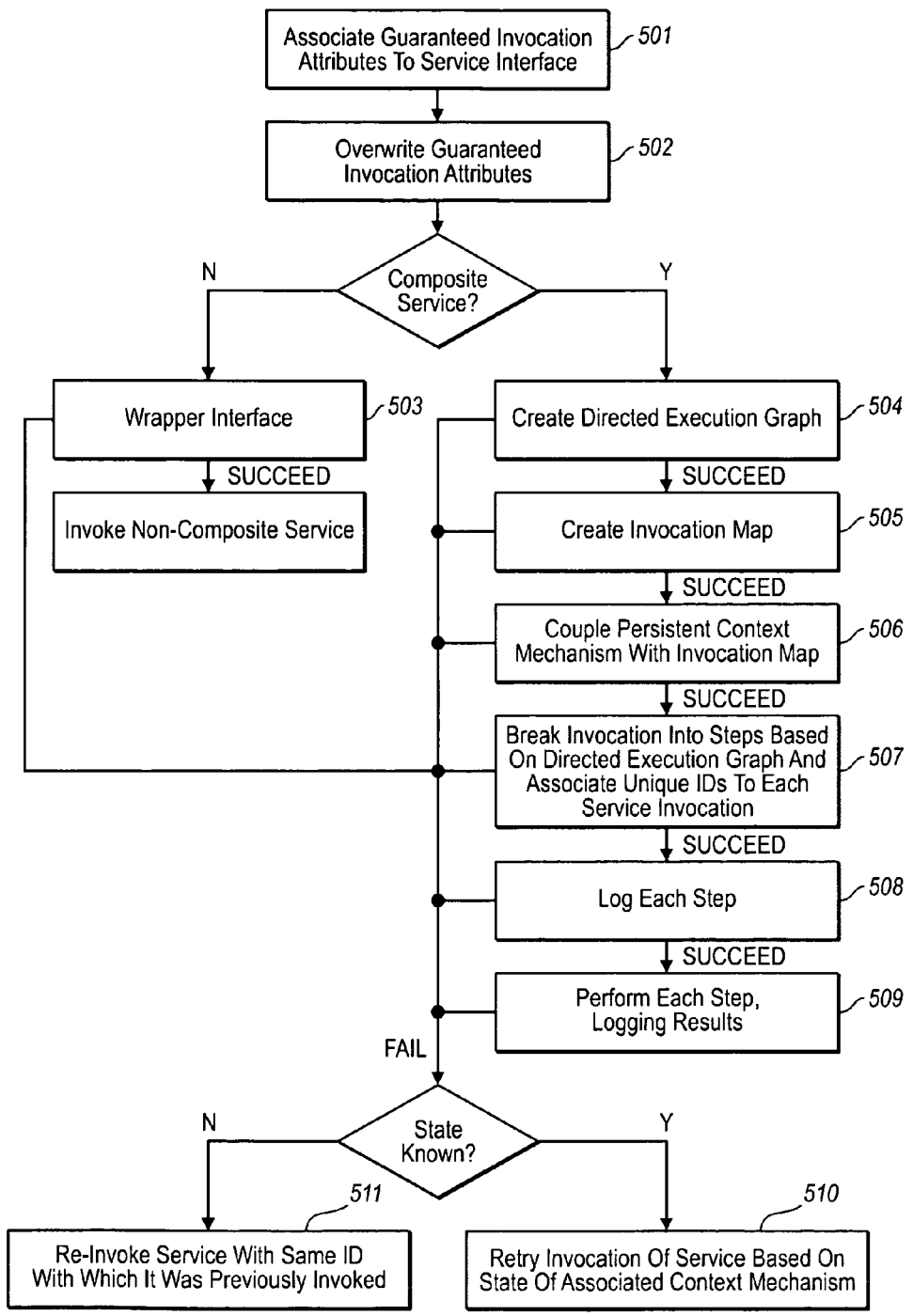
FIG. 5 depicts a flowchart of one embodiment of a method for guaranteeing invocation of composite software services.

Emerging industry standards such as WS-Reliability can be used to originate the request of a reliable invocation of a software service at the root level. In addition, as part of the present invention, an attribute can be associated to the interface of a software service to declare that the invocation of the service must be guaranteed. [See FIG. 1 to see a depiction of an example software service interface]. Other attributes can be associated to a software interface declared to have guaranteed invocation, declaring the number of retries, the time between retries and other attributes determining the behavior of the automating platform. [FIG. 4 shows an example of attributes that can be associated with a software interface to declare guaranteed invocation behavior.] Furthermore, these attributes can be overwritten for a contained software service, in the context of a containing composite service. This allows context-sensitive definition of guaranteed invocation behavior for services embedded within composite software definitions.

To support the automatic implementation of guaranteed invocation behavior for atomic software services, a wrapper interface must be implemented for all service libraries wanting to participate in guaranteed invocation of the associated atomic software service. The implementation of these libraries can simply use standard protocols, such as WS-Reliability, to delegate the guaranteed invocation of the associated service to an external system, beyond the address-space of the automation platform, or it can use proprietary messaging systems and protocols, to guarantee the at least once or the exactly once invocation of the associated atomic service. Here, following the known current art of messaging protocols, the automation platform guarantees that if the same service request is passed to a library more than once, it is always passed with the same unique id.

To support the automatic implementation of guaranteed invocation for nested composite services, a persistent, nested context mechanism is devised. This context mechanism uses a set of service interfaces to provide persistence for the state of the composite service context corresponding to the invoked contained services and the overall state of invocation of the composite service, containing other services, nested to any level of depth. The use of a set of service interfaces for persisting the complete state of the invocation increases the flexibility and customizability of the automating system by providing a layer of encapsulation that allows the automating system to use different storage mediums such as direct file system vs. relational database.

To create a context for a composite service, first a directed graph, hereon referred to as the execution (or invocation) graph, is created that captures the dependencies of all the contained service nodes, based on the connectivity and data dependency of the services. Then, an object, hereon referred to as the Invocation Map is created, based on the execution graph, to hold the context of a composite service upon invocation. Additionally, modifications to shared data structures accessed within the definition of the corresponding composite service are stored in the Invocation Map as an object holding the context of the shared memory.

Upon the invocation of a composite service, the automation platform, instantiates an Invocation Map, corresponding to the execution graph created based on the dependency of contained services. Then, it determines the set of services that can be invoked next by traversing the execution graph in the order of node dependencies, with the nodes with no dependencies or dependencies to the input data of the composite service only, as the first set of nodes; and, the nodes with dependencies to prior nodes and the inputs of the composite service, as the second set of nodes, and so on. After preparing the input data for those services, the automation platform, stores the corresponding datasets within the Invocation Map, while the Invocation Map ensures the persistence of its complete state that at each step corresponds to the state of invocation for the composite service. Then, the automation platform invokes the prepared services, while logging such attempt through the Invocation Map, and associating a unique key, that is also logged, to the invocation of each service, for the purpose of recovery from an unknown state, or in case one of the services fails due to a system error such as connection failure, or external system downtime. Hereon, we will refer to the invocation of each set of prepared services as a Hypercycle. Also, the Invocation Map holds the unique context associated to each atomic library, keyed by the identifier of that library, as part of its overall context.

If a composite service, within another composite service under invocation is encountered, the automation platform, creates an Invocation Map corresponding to the inner-composite service instance, and adds this map to a stack of Invocation Maps that is stored as part of the Invocation Map corresponding to the containing (i.e. the outer) composite service. Now, if another composite service is encountered within the above inner-service, the Invocation Map corresponding to that service will be added to the above inner-service, and so on to any level of depth of nesting.

When the invocation of a contained service within a composite service, regardless of the depth of nesting, fails due to some system failure, such as inability to connect to an external system due to temporary network failure, the automation platform places the entire stacks of Invocation Map directly, or indirectly contained within the root Invocation Map, that is the composite service instance with no parent composite service instance, on a persistent queue. A separate and synchronized thread of the automation platform, examines the queue, at configurable periods, determines the last set of invoked services that failed to complete, and for each of them considering the parameters declared within their interface definition, or the overwriting parameters within the containing composite node, attempts to re-invoke the service with the same unique id used for the invocation of the service prior to this attempt.

At this point, if the service, whose re-invocation is being attempted by the automation platform, is an atomic service, the library guarantees the only once invocation of the that service as described earlier. However, if the service is a composite service, its Invocation Map is restored, and the automation platform, similarly continues the invocation of that composite service. If the invocation is completed, the automating platform returns to the current context, that of the outer composite service, and in the same manner continues the invocation of the outer composite service to the next set of services based on the execution graph. But, if the inner service's invocation fails due to some system failure, the automation platform, increments the number of unsuccessful invocation retires so far, return to the outer service's context, increments the number of unsuccessful retries so far, and so on all the way to the root composite service.

What is claimed is:

1. In a computing system having one or more computers configured to invoke one or more composite software services, each composite software service containing one or more embedded software services, a method of guaranteeing an invocation of a composite software service, the method comprising:

identifying a composite software service containing one or more embedded software services;

receiving a request to invoke the composite software service;

tracking the connectivity and data dependencies among the one or more embedded software services contained within the composite software service;

tracking a context of the composite software service, the context including states of execution of the one or more embedded software services;

associating a unique ID for each of the one or more embedded software services;

invoking one of the one or more embedded software services;

when receiving an indication that invocation of one of the one or more embedded software services has succeeded, updating a state of the successful embedded software service; and when receiving an indication that invocation of one of the one or more embedded software services was unsuccessful, using the unique ID associated with the unsuccessful embedded software service to re-invoke the unsuccessful embedded software service;

wherein receiving an indication that the invocation of one of the one or more embedded software services was unsuccessful comprises receiving indication of at least one of: an unknown state of an embedded software service, an unsuccessful invocation of an embedded software service due to internal system failure, or an unsuccessful invocation of an embedded software service due to external system failure.

2. The method of claim 1, wherein the one or more embedded software services are nested to any depth within the composite software service.

3. The method of claim 1, wherein the invocation and reinvocation of one of the one or more embedded software services is performed based on one or more guaranteed invocation attributes associated with the composite software service.

4. The method of claim 3, wherein the one or more guaranteed invocation attributes specify whether to apply guaranteed invocation protocols, a number of reinvocations, and a time between reinvocations.

5. The method of claim 1, wherein the one or more guaranteed invocation attributes define overwriting attributes for the composite software service configured to overwrite attributes for the one or more embedded software services.

6. The method of claim 5, wherein when receiving an indication that the invocation of one of the one or more embedded software services was unsuccessful, using the unique ID associated with the unsuccessful embedded software service to re-invoke the unsuccessful embedded software service comprises overriding attributes for the unsuccessful embedded software service with the one or more guaranteed invocation attributes of the composite software service.

7. The method of claim 1, wherein when receiving an indication that the invocation of one of the one or more embedded software services was unsuccessful, using the unique ID associated with the unsuccessful embedded software service to re-invoke the unsuccessful embedded software service comprises:

tracking a number of unsuccessful invocations for the unsuccessful embedded software service; and tracking a number of unsuccessful invocations for the composite software service associated with the unsuccessful embedded software service.

8. The method of claim 1, wherein the one or more embedded software services is associated with a service library, wherein invoking one of the one or more embedded software services comprises using the unique ID associated with the invoked embedded software service to access a wrapper interface associated with the service library.

9. In a computing system having one or more computers and performing one or more composite software services, each composite software service containing one or more embedded software services, a method of guaranteeing an invocation of a composite software service, the method comprising:

identifying a composite software service containing one or more embedded software services;

identifying one or more guaranteed invocation attributes associated with the composite software service;

receiving a request to invoke the composite software service;

generating an execution graph representing connectivity and data dependencies among the one or more embedded software services contained within the composite software service;

generating an invocation map having data structures to hold a context of the composite software service, the context including states of execution of the one or more embedded software services;

traversing the execution graph and ordering the one or more embedded software services into steps of invocation;

associating a unique ID for each step of invocation;

preparing input data for each step of invocation;

invoking each step of invocation in the order defined by the execution graph;

when receiving an indication that the invocation of one of the one or more embedded software services has succeeded, recording a state and an output of the successful embedded software service in the invocation map; and when receiving an indication that the invocation of one of the one or more embedded software services was unsuccessful, using the unique ID associated with the unsuccessful embedded software service to re-invoke the unsuccessful embedded software service.

10. The method of claim 9, wherein the one or more embedded software services are nested to any depth within the composite software service.

11. The method of claim 9, wherein the one or more guaranteed invocation attributes are implemented using a software service interface on the composite software service.

12. The method of claim 9, wherein the one or more guaranteed invocation attributes specify whether to apply guaranteed invocation protocols, a number of reinvocations, and a time between reinvocations.

13. The method of claim 9, wherein the one or more guaranteed invocation attributes define overwriting attributes for the composite software service configured to overwrite attributes for the one or more embedded software services.

14. The method of claim 13, wherein when receiving an indication that the invocation of one of the one or more embedded software services was unsuccessful, using the unique ID associated with the unsuccessful embedded software service to re-invoke the unsuccessful embedded software service comprises overriding attributes for the unsuccessful embedded software service with the one or more guaranteed invocation attributes of the composite software service.

15. The method of claim 9, wherein the invocation map holds the context of the composite software service in a persistent context mechanism implemented as a set of service interfaces that provides a layer of encapsulation to an underlying storage medium.

16. The method of claim 9, further comprises at least one of:
wherein preparing input data for each step of invocation comprises storing the input data in the invocation map;
wherein invoking each step of invocation in the order defined by the execution graph comprises logging such attempt in the invocation map; or
wherein associating a unique ID for each step of invocation comprises storing the unique ID in the invocation map.

17. The method of claim 9, wherein receiving an indication that the invocation of one of the one or more embedded software services was unsuccessful comprises receiving indication of at least one of: an unknown state of one of the one or more embedded software services, an unsuccessful invocation of an embedded software service due to internal system failure, or an unsuccessful invocation of an embedded software service due to external system failure.

18. The method of claim 9, wherein when receiving an indication that the invocation of one of the one or more embedded software services was unsuccessful, using the unique ID associated with the unsuccessful embedded software service to re-invoke the unsuccessful embedded software service comprises:
incrementing an unsuccessful invocation retry counter for the unsuccessful embedded software service; and
incrementing an unsuccessful invocation retry counter for the composite software service associated with the unsuccessful embedded software service.

19. The method of claim 9, further comprising:
identifying a second composite software service embedded within the composite software service; and
generating a second invocation map embedded within the invocation map for the composite service, the second invocation map having data structures to hold a context of the second composite software service.

20. The method of claim 9, wherein the one or more embedded software services is associated with a service library, wherein invoking one of the one or more embedded software services comprises using the unique ID associated with the invoked embedded software service to access a wrapper interface associated with the service library.

* * * * *